United States Patent Office 3,442,858
Patented May 6, 1969

3,442,858
PRODUCTS OBTAINED BY CLEAVING
POLYPHENYLENE ETHERS
Allan S. Hay, Schenectady, N.Y., assignor to General
Electric Company, a corporation of New York
No Drawing. Filed Oct. 5, 1967, Ser. No. 673,014
Int. Cl. C08g 23/20
U.S. Cl. 260—47
10 Claims

ABSTRACT OF THE DISCLOSURE

Polyphenylene ethers are cleaved to lower molecular weight products containing alkali metal substituents when reacted with alkali metal adducts of arenes having at least two connected or fused aromatic rings. An alkali metal will react directly with aryl substituted polyphenylene ethers to form an adduct with the polymer which then cleaves to the lower molecular weight products. The products have an average of two alkali metal atoms on each polymer unit. These alkali metal atoms on th products readily react with various reagents to produce derivatives of the cleaved polymer. The alkali metal-containing cleaved polymers may be used in the production of graft or block copolymers.

---

This invention relates to the cleavage of polyphenylene ethers and to the products produced thereby. More particularly this invention relates to alkali metal-containing polyphenylene ethers having lower molecular weights than the starting non-metal-containing polyphenylene ether. Although, this invention may be applied to other than poly (1,4-phenylene ethers), for example, the poly(1,3-phenylene ethers) and the poly(1,2-phenylene ethers) they are generally relative low molecular weight products and generally, as prepared, have both a halogen and hydroxyl end group on each polymer molecule as reactive sites. In contrast, the poly(1,4-phenylene ethers), as generally prepared, are very high molecular weight products having an average of less than one reactive site, specifically a hydroxyl group, per polymer molecule. This invention, therefore, is more specifically concerned with polymers whose preponderant repeating unit is a 1,4-phenylene ether unit.

Polyphenylene ethers, as a general class, are an extremely interesting group of new polymers. These polymers, both homopolymers and copolymers, and processes of producing them are disclosed in my U.S. Patents 3,306,874 and 3,306,875 and my copending application Ser. No. 593,733, filed Nov. 14, 1966, and assigned to the same assignee as the present invention. U.S. Patents 3,268,478 and 3,317,467 are specifically directed to poly (1,3-polyphenylene ethers).

The particular polyphenylene ethers that are most useful in my process are those polymers, including copolymers, having the formula:

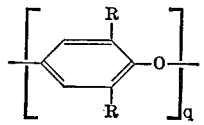

were $q$ is an integer sufficiently large that the number average molecular weight is at least 10,000 and each R of each repeating unit is independently selected from the group consisting of hydrogen, alkyl free of a tertiary α-carbon atom and aryl.

R in the above formula, in addition to being hydrogen, may be anyl alkyl free of a tertiary α-carbon atom, including cycloalkyl and aryl substituted alkyl, examples of which are methyl, ethyl, propyl, isopropyl, n-butyl, sec-butyl, hexyl, cyclohexyl, heptyl, octyl, decyl, octadecyl, eicosyl, benzyl, phenylethyl, naphthylmethyl, phenylpropyl, tolylmethyl, xylylethyl, etc., aryl including alkyl substituted aryl, examples of which are phenyl, tolyl, xylyl, naphthyl, methylnaphthyl, ethylnaphthyl, ethylphenyl, biphenylyl, terphenylyl, etc. Generally, the alkyl and aryl substituents have no more than 20 carbon atoms. Additional example of substituents which R may be, are those alkyl substituents free of a tertiary α-carbon atom and aryl substituents disclosed as substituents on the starting phenols and polyphenylene ether products in my U.S. Patents 3,306,874 and 3,306,875 and copending application, Ser. No. 593,733.

These polyphenylene ethers are readily cleaved by reacting them with an alkali metal adduct of an arene having at least two connected or fused aromatic rings, hereinafter, for brevity, called the cleaving agent. Since the arene moeity of the cleaving agent does not become a part of the polymer molecule, the particular arene moiety is neither important nor critical. Any of the widely known group of alkali metal adducts of arenes having at least two connected or fused aromatic rings may be used. However, since the arene does not become part of the polymer molecule in the cleavage reaction, as mentioned above, there is no incentive or desirability of using any but the simplest arenes having two aromatic rings, i.e., biphenyl, terphenyl and naphthalene which are the most readily available and cheapest arenes having two aromatic rings.

These arenes, when dissolved in an ether solvent, for example, dimethyl ether, the dimethyl ether of ethylene glycol, the dimethyl ether of diethylene glycol, tetrahydrofuran, etc., or in a hydrocarbon solvent in the presence of a tertiary amine, for example, benzene, toluene, xylene, etc., containing a trialkyl amine including polyamines, for example, trimethylamine, triethylamine, N,N,N',N'-tetramethylethylenediamine, hexamethylphosphortriamide, etc., readily react with an alkali metal, for example, lithium, sodium, potassium, rubidium or cesium to produce an intensely colored adduct of the alkali metal and the arene without displacement of hydrogen or formation of a metal-to-carbon bond.

These adducts are to be differentiated from the organometallic compounds formed by a displacement reaction of an alkali metal with arenes having only one aromatic ring, for example, benzene, toluene or xylene to form the corresponding phenyllithium, benzyllithium, etc., wherein the metal is directly bonded to a carbon atom. These latter organometallic compounds react in an entirely different way with polyphenylene ethers to metalate the phenylene ring or alkyl side chain without cleavage of the polymer as disclosed and claimed in my copending application, Ser. No. 673,021, now U.S. Patent 3,402,144, filed concurrently herewith and assigned to the same assignee as the present invention. Likewise, the alkali metal adducts of arenes of the present invention are to be differentiated from the alkali metal adducts of diaryl ketones. As disclosed and claimed in my copending application, Ser. No. 672,956, now U.S. Patent 3,402,143, filed concurrently herewith and assigned to the same assignee as the present invention, the alkali metal adducts of diaryl ketones lead to decolorization and activation, but not cleavage, of the polyphenylene ethers so that the polymers are readily capped with etherifying or esterifying agents.

It appears that the alkali metal adducts of arenes having at least two joined or fused aryl rings form a class of organometallic compounds which are much more reactive with the polyphenylene ethers than the alkali metal adducts of diaryl ketones or the alkali metal alkyls or aryls. It appears that they are capable of transferring the alkali metal to the polyphenylene ether forming an ionic alkali metal adduct which is either so reactive or so unstable that it spontaneously cleaves the polymer molecule into smaller segments.

As mentioned previously, alkali metals readily add to arenes having at least two joined or fused aromatic rings. Since a polyphenylene ether which has an aryl substituent, e.g., poly(2-methyl-6-phenyl-1,4-phenylene ether), poly (2,6-diphenyl-1,4-phenylene ether), etc., basically contains two aryl rings joined together in each repeating unit of the polymer molecule, such polyphenylene ethers react directly with the alkali metal to form the ionic alkali metal adduct directly without necessity of forming the intermediate adduct with an arene. This means that these polyphenylene ethers or copolymers containing at least one such phenylene unit in the polyphenylene molecule, can be reacted directly with the alkali metal or with the alkali metal adduct of an arene, whereas, other polyphenylene ethers, which do not have an aryl substituent on the phenylene ring of the repeating unit, e.g., poly (1,4-phenylene ether), poly (2,6-dimethyl-1,4-phenylene ether), etc., require the use of an alkali metal adduct of an arene having two aromatic rings, for example, the alkali metal adducts of biphenyl, terphenyl, naphthalene, etc. In either case, the alkali metal reagent reacts extremely rapidly with the polyphenylene ethers at room temperature to cleave the polymer.

In this cleavage reaction, any hydroxyl groups are converted to the corresponding alkali metal salt and an alkali metal atom is added onto both halves of the polymer at the point of cleavage. When the molecular weight of the polyphenylene ether initially used is of very low molecular weight, for example, a trimer having three polymer units, cleavage seems to be specific as to the point of cleavage as illustrated by the following general equation:

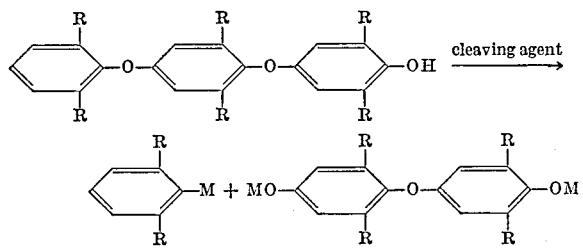

where M is the alkali metal atom of the cleaving agent. As Example 1 illustrates, reaction of the mixture of cleaved products leads only to two of the six possible products of a single cleavage reaction showing that cleavage of this compound occurs at only one out of the possible four sites, i.e., on either side of the two ether oxygen atoms.

However, as the molecular weight increases, this specificity disappears and cleavage becomes more and more random, both as to which side of the ether oxygen and as to what particular either oxygen in the polymer chain is cleaved. For example, when a polyphenylene ether having a very narrow molecular weight distribution is cleaved by the process of this invention, the molecular weight distribution is broader than that of the initial polymer, showing that cleavage has occurred at different points, rather than at the same point of each polymer molecule.

This means that when relatively high molecular weight polymers are cleaved by the process of this invention, the pairs of polymer units obtained after a single cleavage of the polymer molecules will be a mixture of polymer molecules having the four following general formulas:

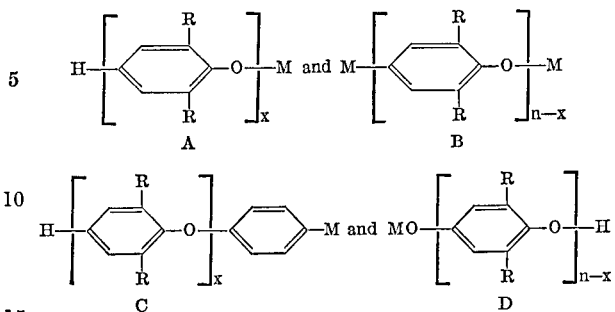

The polymer molecules represented by Formulas A and B occur as the pair of products when cleavage occurs on one side of the ether group, whereas, the polymers of Formulas C and D occur as the pair of products when cleavage occurs on the other side of the ether group and $x$ is a variable quantity dependent on which ether group is cleaved and has a value less than $n$ of the particular polyphenylene ether molecule cleaved. M is as defined above.

Once a given polymer molecule is cleaved, then the polymer molecules so produced are also capable of being cleaved to polymers of still lower molecular weight. The second cleavage of a polymer molecule, in addition to producing polymers represented by Formulas A′, B′, C′ and D′ also produces polymers having Formulas E and F. The prime used with A through D, indicates that $x$ has

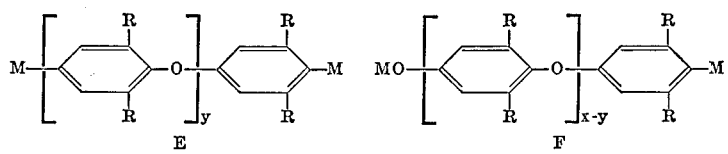

been replaced by $y$ and $n-x$ by $x-y$ in the above Formulas A through D, where $y$ of the six formulas represents an integer whose value is less than $x$, the number of repeating polymer units of the specific polymer molecule which is cleaved.

Cleavage of polymers having Formula A leads to either one of two pairs of lower molecular weight polymers having Formulas A′ and B′ or C′ and D′. Cleavage of polymers having Formula B produces either two products, both of which have Formula B′ or a pair having Formulas D′ and E. Cleavage of polymers having Formula C produces pairs of polymers having either Formulas A′ and E or C′ and F. Cleavage of the polymers having Formula D leads to a pair of products, either having Formulas B′ and D′ or D′ and F. Subsequent cleavage of these polymers leads to polymers having all of the above six formulas but having still lower molecular weights.

It is evident from these reactions, that each succeeding cleavage reaction on a given solution of polymer will require an increasing amount of the cleaving agent and will increase the percentage of polymer molecules which have two metal atoms. Therefore, by starting with a high molecular polyphenylene ether and using a sufficient amount of cleaving agent to produce repeated cleavages of the polymer molecules, it is possible to produce a final product which essentially will have two metal atoms for each polymer molecule. Furthermore, the cleavage reaction can be controlled as to the extent or degree of cleavage obtained by the amount of cleaving agent added to the polymer.

The reaction, preferably, is carried out in a mutual solvent for both of the reactants, i.e., the polyphenylene ether and the cleaving agent, since the reaction is much faster in a homogeneous solution. There is no advantage to carrying out the reaction in a two phase liquid system in which one reactant is soluble in one phase and the other reactant in the second phase or in a heterogeneous system in which one reactant is in solution and the other is present as a solid. Generally, solvents, which will dissolve both reactants, will also dissolve the cleaved metal-containing products, although, this is not essential, especially, for the final product. In fact by using a solvent system which will precipitate the product when it has reached a predetermined molecular weight is a means which can be used to obtain a more uniform molecular weight final product since the precipitated polymer will be cleaved much less rapidly than the polymer still remaining in solution.

The liquid arenes, for example, benzene, toluene, xylene are good solvents for the polyphenylene ethers and in the presence of a tertiary amine are good solvents for the cleaving agent. Tetrahydrofuran and alkyl substituted tetrahydrofurans are readily available cyclic ethers which also are good solvents for both the polyphenylene ethers and cleavage agent in the absence of a tertiary amine. Ethers of polyhydric alcohols, for example, the dimethyl, diethyl, etc., ethers of ethylene glycol, diethylene glycol, etc., are good solvents for the cleavage agent but not for the polyphenylene ethers. However, since these ethers are readily miscible with liquid arenes, a homogeneous reaction mixture may be obtained by mixing the solution of the cleavage agent in one of these ether solvents with a solution of the polyphenylene ether in a liquid arene, especially when the volume of the arene is large in comparison to the volume of the ether.

Of these solvents, benzene is not reactive with the alkali metal adduct, whereas, the other solvents slowly react wtih it. However, they can be used if the solutions are used shortly after they are prepared or are kept refrigerated.

An advantage benzene has as a solvent is, that when the polyphenylene ether being cleaved contains alkyl substituents, there is some tendency for the alkali metal which is directly bonded to the carbon atom of the phenylene group to transfer to the α-carbon atom of the alkyl substituent but this transfer reaction appears to be inhibited by benzene, especially at or below ambient temperature. If all of the substituents on the phenylene ether are aryl or there are no substituents, no transfer occurs. The tendency to transfer to the alkyl substituent is favored by long reaction times, elevated temperatures, the particular alkali metal, and, based on my investigation, apparently the solvent used. Transfer appears to be less pronounced in benzene than any of the other solvents. Of the alkali metals, lithium also has less tendency to transfer. Although this migration of the alkali metal to the α-carbon atom of an alkyl substituent on the phenylene nucleus does not destroy the reactivity or the ability to make derivatives of the polyphenylene ethers after transfer has occurred, it is generally more desirable to carry out the cleavage reaction to minimize or eliminate such transfer, i.e., by the use of ambient or lower temperatures, the use of benzene as a solvent, etc.

Since the alkali metals, the alkali metal adducts of the arenes and the cleaved polyphenylene ethers having alkali metal substituents are extremely reactive with oxygen, carbon dioxide, water, alcohols, etc., contact with such materials should be avoided not only in the preparation of the adducts, but also during the storage and usage of these materials until such time as reaction with such agents is desired. Consequently, an inert atmosphere should be used and all reagents and solvents should be anhydrous.

If the cleaved polymer precipitates from the reaction mixture, it may be separated from the balance of the reaction mixture by centrifugation, filtration, etc. in an inert atmosphere. If the cleaved polymer remains in solution, it may be recovered from the balance of the reaction mixture by adding a liquid alkane to the reaction mixture or vice-versa to precipitate the cleaved polyphenylene ether which thereafter is recovered by filtration or centrifugation. Since the cleaved polymer has alkali metal substituents, it is best stored under the surface of a liquid alkane to protect it from the effect of oxygen, carbon dioxide or moisture until it is ready for use in preparing various derivatives. If the metal containing polyphenylene ether is to be used to prepare other derivatives, it is not necessary to isolate it from the reaction mixture.

In addition to the cleavage reaction described above, secondary reactions also ocur which are beneficial to the final products. In the oxidative coupling of phenols to produce polyphenylene ethers, a phenolic hydroxyl group is present on one end of each of the polymer molecules up to the point when the polymers have a number-average molecular weight of about 20,000. As the coupling reaction is continued, to produce higher molecular weights, a secondary reaction, the mechanism of which is as yet unknown, causes some of these terminal hydroxyl groups to disappear. Other secondary reactions also occur which produce color in the polymer. The chromophores can be due to amines and/or diphenoquinones, sorbed or incorporated in the polymer molecule, carbonyl groups formed on the polymer molecule, etc. I have found that the chromophores react very rapidly with the cleaving agent, so that subsequent reaction of the metal containing polyphenylene ethers with various reagents converts the chromophores to colorless derivatives. The preferred means of decolorizing polyprenylene ethers by this technique is disclosed and claimed in above-referenced U.S. Patent 3,402,143.

The cleavage reaction of the polyphenylene ethers generally is carried out by adding the cleaving agent in the desired amount to a solution of the polyphenylene ether. The stoichiometry of the reaction requires one alkali metal atom for each hydroxyl group on the polymer molecule cleaved. Since each cleavage reaction produces two polymer molecules from each initial polymer molecule and each of these newly produced polymer molecules will require two atoms of the alkali metal, the amount of alkali metal required for each subsequent cleavage reaction is double the amount for the previous cleavage reaction. Since hydroxyl groups are not generated by the cleavage reaction, no alkali metal needs to be added for such a group except for the hydroxyl group present in the initial polymer.

The cleavage reaction occurs so rapidly and easily at room temperature that there is no necessity for using higher or lower temperatures or for the use of super- or subatmospheric pressure. However, the use of these techniques is not excluded. If elevated temperatures are used, consideration should be given to the previously mentioned transfer reaction of the alkali metal to the alkyl side chain and also to the fact that the stability of the cleaving agent is adversely affected by elevated temperatures.

In order that those skilled in the art may bettter understand my invention, the following examples are given by way of illustration and not by way of limitation. In all the examples, all parts and percentages are by weight unless stated otherwise.

As mentioned previously, the cleaved polymers are extremely reactive because of the alkali metal substituents. Therefore, in all the examples, an inert, moisture-free atmosphere was maintained over the reaction mixture where any organometallic compound was present and special precautions were taken to dry the solvents used. Also, in order to permit analysis of the products to determine the degree of cleavage and to otherwise characterize the product, the cleaved polyphenylene ethers were converted to derivatives which not only demonstrate the utility of the cleaved polymers, but also produced polymers which could be readily analyzed by ordinary techniques.

GENERAL PROCEDURE

Unless stated otherwise, the procedure used was to dissolve the well dried polyphenylene ether in an anhydrous solvent. The solution of the polymer was placed in a reaction vessel equipped with magnetic stirrer, reflux condenser, nitrogen inlet and either a pressure-equalizing, dropping funnel or a self-sealing rubber closure. An inert atmosphere of dry, oxygen-free nitrogen was established and maintained during the reaction. When the cleaving agent was added to a solution of the polymer in the reactor, it was added from a syringe through self-sealing rubber closure. When the solution of the polymer was added to the solution of the cleaving agent in the reactor, it was added from the dropping funnel.

The cleavage reaction was terminated by adding the various reagents recited to produce derivatives that could be readily analyzed. Since the derivative has substituent groups in the same position and to the same extent as the alkali metal substituents on the cleaved product, the position of the alkali metal substituent and the extent of cleavage which has occurred is identical to the results obtained for the derivative.

The polymeric product was precipitated by pouring the reaction mixture into methanol containing a small amount of aqueous hydrochloric acid. The product was purified by redissolving the polymer, generally in chloroform, filtering, and reprecipitating the polymer with methanol. After isolating the polymer it was dried, generally in a vacuum at 100° C.

By this procedure, the alkali metal substituents on carbon atoms were converted by water to —H (i.e.,

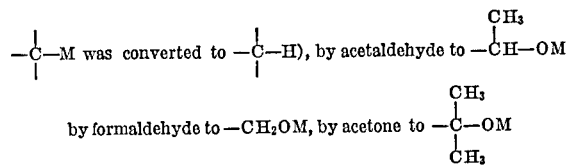

by $CO_2$ to —COOM, by $(CH_3)_3$SiCl to —Si$(CH_3)_3$ and by ethylene oxide to —$CH_2CH_2$OM. The —OM groups on these substituents as well as on the polymer itself were converted to —OH groups by the treatment with acid except where the above silylating agent had already converted the —OM group on the polymer to $$—O—Si(CH_3)_3$$

Since these reactions are general for aldehydes, ketones, alkylene oxides, monohalosilanes, monohalosiloxanes, etc., it is obvious that a broad range of derivatives can be made by this reaction as more fully disclosed in my previously mentioned U.S. Patent 3,402,144. Furthermore, instead of acidifying with an acid to convert the —OM groups to —OH groups, acyl halides, alkyl halides, dialkyl sulfates, etc., can be used to convert the —OM groups to the corresponding esters, ethers, etc., as more fully disclosed in my above-mentioned U.S. Patent 3,402,- 143. In the case of those reactants that produce substituents containing —OM groups, i.e., aldehydes, ketones, alkylene oxides, etc., which themselves can add further with these groups, only the amount necessary to discharge the color of the solution is added. These and other variations will be readily apparent to those skilled in the art from the following specific examples. Wherever poly(2,6-dimethyl-1,4-phenylene ether) is recited in the examples, it was a portion of a stock polymer having a number average molecular weight of 21,600 and an average of 0.4 hydroxyl groups per polymer chain. All molecular weights are number average values. Structures of the polymers produced were determined using infrared and P.M.R. spectroscopy and titration of free hydroxyl groups by reaction with excess acetic anhydride in the presence of pyridine and back-titrating with standard alkali.

EXAMPLE 1

In this example, the cleaving agent, lithium-biphenyl complex, was made in the reaction vessel described in the general procedure by dissolving 0.0462 g. of lithium in a solution of 0.462 g. of biphenyl in 15 ml. of tetrahydrofuran. Solution of the lithium was completed in two hours, at which point 1.0795 g. of 4-[4'-(2'',6''-dimethylphenoxy) - 2',6' - dimethylphenoxyl]-2,6-dimethylphenol, the trimeric polyphenylene ether of 2,6-xylenol, dissolved in 10 ml. of anhydrous ether was added. The reaction was carried out at 0° C. for two hours and terminated by pouring the reaction mixture onto crushed solid carbon dioxide. After warming to room temperature, the resulting clear liquid was poured into ether producing a white precipitate which dissolved when a small amount of hydrochloric acid was added.

Vapor phase chromatography showed that the solution contained only two products from the cleavage reaction. The ether layer was extracted twice with a 5% aqueous solution of sodium bicarbonate to extract any acidic component and then twice with a 10% aqueous solution of sodium hydroxide to extract any phenolic component. Acidification of the combined sodium bicarbonate extracts precipitated 2,6-dimethylbenzoic acid. Acidification of the combined sodium hydroxide extracts precipitated the phenolic component whose infrared spectrum was identical with 4-(4'-hydroxy-2',6'-dimethylphenoxy 2,6-methylphenol (see Example 7). Therefore, cleavage had occurred as indicated by the jagged line in the following equation:

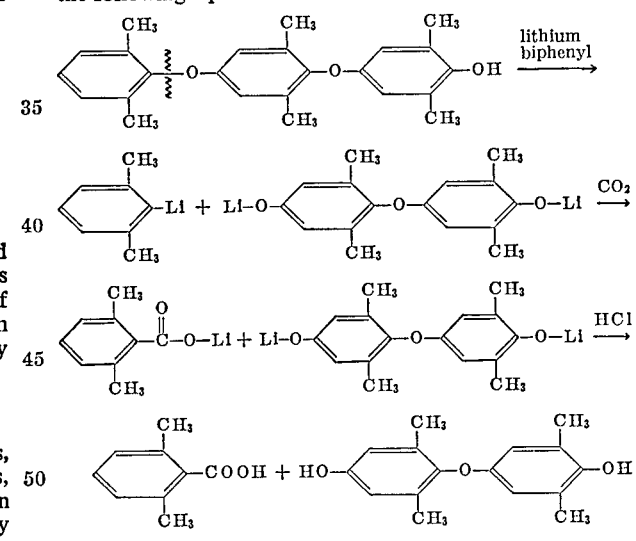

EXAMPLE 2

This example illustrates the effect of the amount of cleaving agent on the number of cleavages per polymer molecule. Four identical solutions were prepared containing 8.64 g. (0.0004 mole) of poly(2,6-dimethyl-1,4-phenylene ether) in 100 ml. of benzene. To each of these solutions, the lithium-biphenyl complex, prepared as described in Example 1, was added to the polymer solutions as described in the general procedure, so that the ratios of the moles of cleaving agent per mole of polyphenylene ether were 7.5, 10, 20, and 37.5, respectively. After one hour reaction at room temperature, water was added and sufficient hydrochloric acid added to acidify the aqueous layer. After separation of the aqueous layer, the polymers were precipitated by pouring the organic layer into methanol. The recovered polymers had molecular weights of 10,000, 6,700, 2,900 and 1,100 respectively.

The reaction of the cleaved polymer with water followed by acidification, had converted the cleaved polymer back to polymer molecules whose structure was the same as the starting polymer, i.e., the lithium atoms on the carbon atom of the phenyl nucleus had been converted to hydrogen and the lithium phenoxide groups had been converted to phenolic hydroxyl groups, so that the polymer molecules of the cleavage reaction had the same basic structure as the starting phenol, but were of lower molecular weight. There is some difference in the position of the hydroxyl end groups due to the cleavage reaction producing compounds having Formulas A–F as discussed above. This example therefore illustrates how my cleavage reaction may be used to produce useful, lower molecular weight polymers which still have essentially the same structure as the starting, high molecular weight polymer.

Similar results are obtained when sodium, potassium rubidium and cesium are used in place of the lithium in forming the complex with the biphenyl and also when terphenyl and naphthalene are used in place of the biphenyl in forming the complex used to cleave the polyphenylene ether in the above example.

EXAMPLE 3

The following example shows that effect of time on the cleavage reaction using a constant ratio of cleaving agent to the polyphenylene ether. Using the general procedure 0.207 g. of lithium wire was dissolved in a solution of 2.310 g. of biphenyl in 200 ml. of tetrahydrofuran overnight producing a deep green solution. To this solution was added 30 g. of poly(2,6-dimethyl-1,4-phenylene ether) in 300 ml. of benzene. After addition was completed, the solution was orange-red color. The dropping funnel was replaced with a self-sealing rubber closure through which 30 ml. aliquots were withdrawn after 1, 2, 4, 6, 10 and 22 hours of reaction time with a syringe and immediately to crushed solid carbon dioxide. After precipitation and isolation as described in the general procedure, it was found that the polymers after the various reaction times did not differ from each other within the limits of experimental error, indicating that the reaction was rapid and complete within at least one hour. The molecular weight of each of the polymers had been decreased to about 16,000.

EXAMPLE 4

Using the general procedure, 0.0552 g. of lithium was dissolved in a solution of 0.616 g. of biphenyl in 100 ml. of hexamethylphosphortriamide by stirring for 5 hours at room temperature. At the end of this time, 4.32 g. of finely divided poly(2,6-dimethyl-1,4-phenylene ether) was added. As the copolymer dissolved, the blue-green color of the solution became a deep maroon. At the end of 8 hours, 1 ml. of trimethylchlorosilane was added to react with the lithium groups which had been substituted on the polyphenylene ether during the cleavage reaction. After 30 minutes, the polymer was precipitated as described in the general procedure. The molecular weight of the polymer was now 5,100. The isolated polymer of this example corresponds to the Formula A through F, inclusive, in which the —M of both the —C—M and —O—M groups were now —Si(CH$_3$)$_3$.

When this example was repeated, but using 0.184 g. of sodium in place of the lithium and adding the polyphenylene ether as a solution in 50 ml. of benzene and using only a 1 hour reaction time for the cleaving agent with the polyphenylene ether, the molecular weight of the isolated polymer was 4,500. Similar results are also obtained when equivalent weights of potassium, rubidium and cesium are used in place of the lithium or sodium as well as when terphenyl and naphthalene are used in place of the biphenyl in this example.

EXAMPLE 5

Example 2 was repeated three times using a molar ratio of 20 moles of the cleaving agent per mole of polymer, but instead of reacting the cleaved polymer with water, one was reacted with solid carbon dioxide, the second with acetone, and the third with acetaldehyde at room temperature for 2 hours. Prior to precipitating the polymer, the solutions were treated with water containing sufficient hydrochloric acid that the water remained acid. This step converts the lithium salts to free acids or alcohols. The polymeric products had molecular weights of approximately 2,300 as determined by the vapor phase osmometer. The polymers from this reaction have Formulas A–F, inclusive in which the —M of the —C—M groups had been converted by reaction with carbon dioxide to carbonyl groups, by reaction with acetone to α-hydroxy isopropyl groups and by reaction with acetaldehyde to α-hydroxy ethyl groups, while the M in the —O—M groups had been converted to —OH groups.

EXAMPLE 6

The lithium adduct of biphenyl was prepared by dissolving 4.6 g. of a 30% dispersion of lithium in mineral oil in a solution of 15.4 g. of biphenyl in 300 ml. of tetrahydrofuran. Titration of this solution showed that it was 0.315 molar with respect to the adduct. Three solutions were made, each containing 17.28 g. of poly(2, 6-dimethyl-1,4-phenylene ether) in 300 ml. of benzene. To each of these solutions, 25.4 ml. of the above cleaving agent was added and the reaction allowed to proceed for 1 hour at room temperature, by which time the solutions had become dark maroon in color. At the end of the reaction period, one solution was treated with acetone, the other with ethylene oxide and the other with gaseous formaldehyde made by thermal decomposition of trioxane until the color of the reaction mixture was discharged. Each of the reactions were, thereafter, treated with 100 ml. of water and sufficient hydrochloric acid added to make the aqueous layer acid. Before precipitation of the polymer using the general procedure, the treatment with water and acid had converted the —O—Li groups of all three polymers to —OH groups. The treatment with acetone had converted the —C—Li groups to

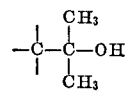

The treatment with ethylene oxide had converted the

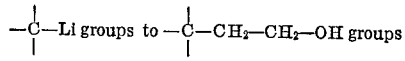

while the treatment with formaldehyde had converted the

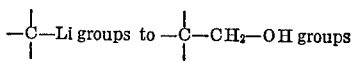

The molecular weights of the recovered polymers were approximately 8,000.

EXAMPLE 7

The following example was done to recover the lowest molecular weight hydroxyl component in the cleavage reaction. A solution of 1.3 g. of lithium in 14 g. of biphenyl and 150 ml. of tetrahydrofuran was prepared in a 300 ml. screw cap bottle in an inert atmosphere. After the lithium was dissolved, 10 g. of poly(2,6-dimethyl-1,4-phenylene ether) was added in powered form. The bottle was shaken for 23 hours at room temperature and poured into water and extracted with ether. The ether layer washed with dilute sodium hydroxide. The sodium hydroxide layer was separated from the organic layer and acidified with aqueous hydrochloric acid and extracted with ether. After drying the ether layer, evaporation produced 2 g. of a solid having a melting point of 145–170° C. Two recrystallizations from heptane-ethyl acetate gave 1.5 g. of a white solid melting at 175–176° C. Elemental analysis and molecular weight determination showed this compound to be 4-(4'-hydroxy-2',6'-dimethylphenoxy)-2,6-dimethylphenol. The theoretical values for this compound are given in the parenthesis following the determined values. Carbon 74.0 (74.4), hydrogen 7.0 (7.0), molecular weight 267±5% (258.3).

EXAMPLE 8

This example illustrates reacting the alkali metal directly with a polymer having a phenyl substituent. Using the general procedure, 1.150 g. of a 40% dispersion of sodium in mineral oil and 15 ml. of hexamethylphosphotriamide was added to a solution of 17.5 g. of poly(2,6-diphenyl-1,4-phenylene ether), (molecular weight of 350,000) dissolved in 450 ml. of tetrahydrofuran. This reaction was allowed to proceed for 2 hours at room temperature during which time the initial light green solution became a deep purple and there was a noticeable decrease in viscosity of the solution. At the end of this time, water was added and the polymer precipitated as described in the general procedure. There was obtained 15.9 g. of poly(2,6-diphenyl-1,4-phenylene ether) having a molecular weight of 7,000 showing that approximately 50 cleavage reactions have occurred for each polymer molecule. In this reaction, the ratio of atoms of sodium to polymer was 400 atoms of sodium per polymer molecule.

When this example was repeated except using 250 ml. of benzene instead of the 450 ml. of tetrahydrofuran to dissolve the polymer, the molecular weight of the cleaved polymer was 5,000 showing approximately 70 cleavage reactions of each initial polymer molecule.

EXAMPLE 9

To demonstrate the effect of various ratios of alkali metal and the effect of the hexamethylphosphortriamide on the cleavage reaction, Example 8 was repeated omitting the hexamethylphosphortriamide and the ratio of sodium atoms per polymer molecule was varied from 200 to 1 to 700 to 1. Also to demonstrate the use of other terminating agents, some of the reactions were terminated by reacting the alkali metal atoms of the polyphenylene ether with trimethylchlorosilane and others with ethylene oxide to introduce different end groups onto the polymer molecule. The molecular weights of the polymers obtained are shown in Table I.

TABLE I

| Ratio Na/polymer: | Molecular wt. |
|---|---|
| 200/1 | 34,000 |
| 300/1 | 21,000 |
| 440/1 | 15,000 |
| 550/1 | 16,500 |
| 600/1 | 25,000 |
| 700/1 | 14,000 |

It would appear that the last three results are anomalous, however, it was noted that the yield of recovered polymer had decreased considerably for these polymers compared to that obtained in the other three runs. When the last three runs were repeated, but hexane used instead of methanol as a precipitant, the yields of recovered polymer were increased to that obtained in the other reactions. Treatment of the recovered polymer with methanol dissolved approximately 50% in the case where the ratio had been 550 to 1 and 75% where the ratio was 700 to 1. This demonstrates that the precipitation into methanol had fractionated the polymer and that the polymer was only the higher molecular weight portion. A thin layer chromatograph of the methanol-soluble portion showed a trace of 2,6-diphenol and a broad spectrum of low molecular weight oligmers starting with the dimer.

Similar results are obtained when poly(2-methyl-6-phenyl-1,4-phenylene ether) is substituted for the poly(2,6-diphenyl-1,4-phenylene ether). However, in carrying out this reaction, it is best to dissolve the polymer in benzene containing a tertiary amine or hexamethylphosphortriamide as the solvent, rather than using tetrahydrofuran, to minimize any chance of transfer of the alkali metal from the ring carbon atom to methyl group.

The polyphenylene ether products have a wide variety of uses. The alkali metal atoms substituted on the polyphenylene ethers are extremely reactive. As illustrated in the specific examples, reaction with water regenerates a polymer having the same structure as the starting polymer but having lower molecular weight. The products may therefore be used to obtain polyphenylene ethers of lower molecular weight than the starting polyphenylene ethers so as to produce polyphenylene ethers having lower flow points. Those still possessing molecular weights greater than 10,000 may be used to produce molded objects, films, fibers, etc., in the same way as the initial polyphenylene ethers or they, like the polymers having molecular weights less than 10,000, may be incorporated in very high molecular weight polyphenylene ethers to act as plasticizers, flow extenders, etc. By reaction with aldehydes, ketones or alkylene oxides, the products can be converted into polyphenylene ethers having hydroxyl groups as the two terminal groups of the polymer chain. Such products can be used as the dihydric reagent to prepare polyesters, polycarbonates, etc., which are useful as coating compositions, molding compositions, etc. These and other uses for the compositions of my invention will be readily apparent for those skilled in the art.

All of the above examples have shown various modifications and variations of the present invention. Other modifications and variations which are possible in light of the above teachings, will be readily apparent to those skilled in the art. It is therefore to be understood that changes may be made in the particular embodiments of the invention described which are within the full intended scope of the invention as defined by the appended claims.

What I claim is:

1. Polyphenylene ethers having the formula:

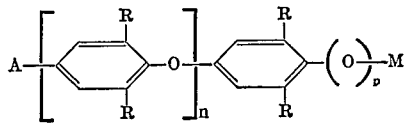

where R is selected from the group consisting of hydrogen, alkyl free of a tertiary α-carbon atom and aryl, $n$ is an integer such that the molecular weights of the polyphenylene ethers are in the range of from 1100 to 34,000, $p$ is one of the integers 0, 1, M is an alkali metal and A is selected from the group consisting of —M and, when $p$ is 0, —OM where M is defined above.

2. The polymers of claim 1 which are lithium-containing poly(2,6-dimethyl-1,4-phenylene ethers).

3. The polymers of claim 1 which are sodium-containing poly(2,6-dimethyl-1,4-phenylene ethers).

4. The polymers of claim 1 which are potassium-containing poly(2,6-dimethyl-1,4-phenylene ethers).

5. The polymers of claim 1 which are lithium-containing poly(2,6-diphenyl-1,4-phenylene ethers).

6. The polymers of claim 1 which are sodium-containing poly(2,6-diphenyl-1,4-phenylene ethers).

7. The polymers of claim 1 which are potassium-containing poly(2,6-diphenyl-1,4-phenylene ethers).

8. The process of producing a mixture of polyphenylene ethers having the formula:

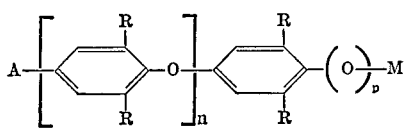

where R is selected from the group consisting of hydrogen, alkyl free of a tertiary α-carbon atom and aryl, $n$ is an integer and is at least 1, $p$ is one of the integers 0, 1, M is an alkali metal and A is selected from the group consisting of —M and, when $p$ is 0, —OM where M is defined above, which comprise reacting a polyphenylene ether having the formula:

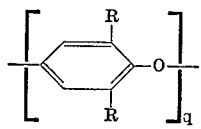

where R is defined above and $q$ is an integer sufficiently high that the molecular weight is at least 10,000 with an alkali metal reagent selected from the group consisting of alkali metal adducts of biphenyl, alkali metal adducts of terphenyl, alkali metal adducts of naphthalene and, in addition, when at least one R of at least one repeating unit of the polyphenylene ether is aryl, an alkali metal, the amount of said alkali metal reagent being sufficient to cause multiple cleavage of the polyphenylene ether molecules.

9. The process of claim 8 wherein the polyphenylene ether is poly(2-methyl-6-phenyl-1,4-phenylene ether) and the reagent is an alkali metal.

10. The process of claim 8 wherein the polyphenylene ether is poly(2,6-diphenyl-1,4-phenylene ether) and the reagent is an alkali metal.

References Cited

UNITED STATES PATENTS

| | | | |
|---|---|---|---|
| 3,287,421 | 11/1966 | Fox | 260—613 |
| 3,318,959 | 5/1967 | Borman | 260—613 |

FOREIGN PATENTS

| | | |
|---|---|---|
| 1,015,501 | 1/1966 | Great Britain. |

OTHER REFERENCES

Morton et al., J. Am. Chem. Soc. 76, 2973–80 (1954).
Eargle, J. Org. Chem. 28, 1703–05 (1963).

WILLIAM H. SHORT, *Primary Examiner.*

M. GOLDSTEIN, *Assistant Examiner.*

U.S. Cl. X.R.

260—33.2, 612, 613, 860